A. V. A. McHARG.
METER TESTING CUT-OUT.
APPLICATION FILED MAY 31, 1912.
1,052,608.
Patented Feb. 11, 1913.
3 SHEETS—SHEET 1.
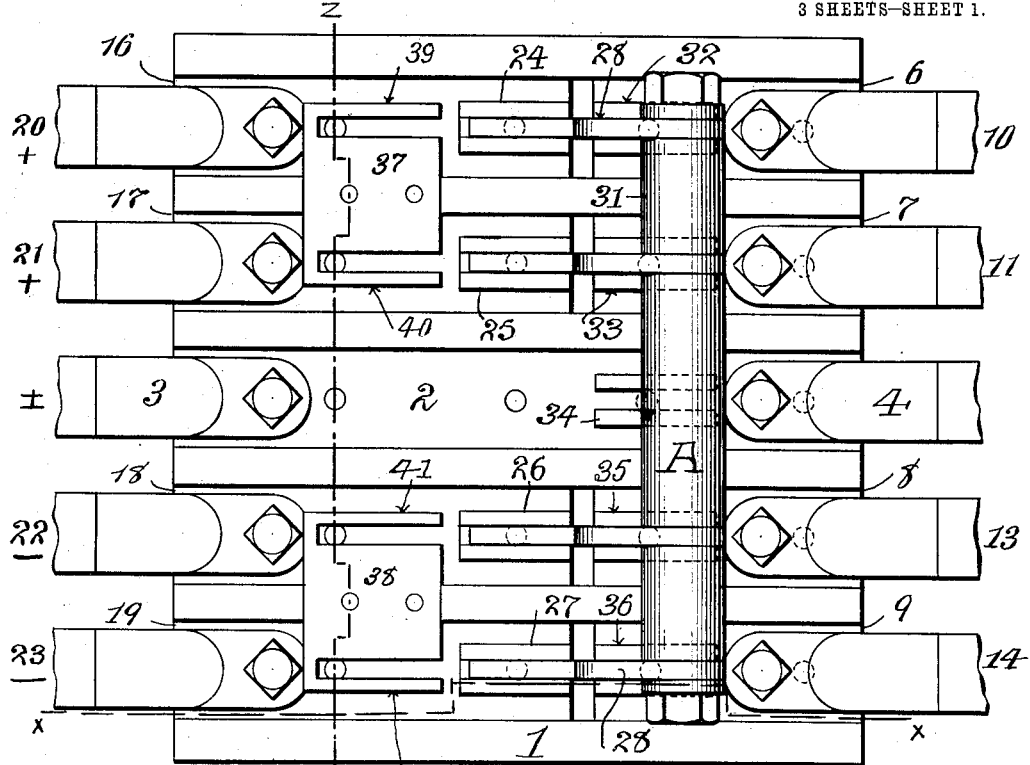
Fig. 1.
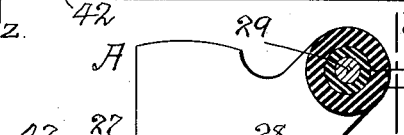
Fig. 2.
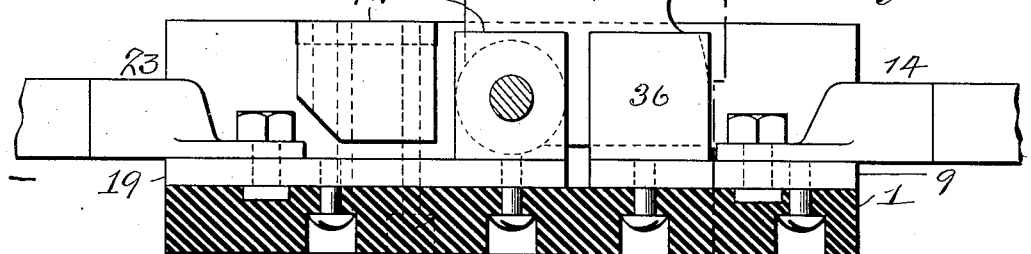
Fig. 3.
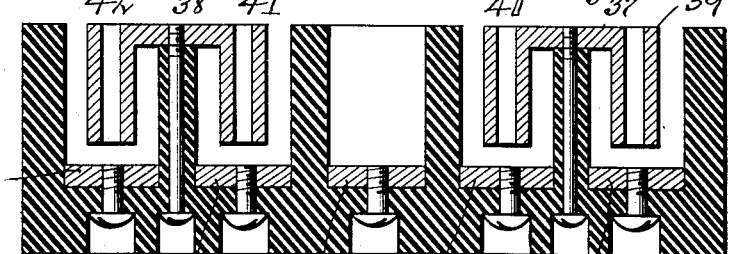
Witnesses:
Gertrude T. Foster
May T. McGarry
Inventor
Arthur V. A. McHarg
By his Attorney A. V. A. McHARG.
METER TESTING CUT-OUT.
APPLICATION FILED MAY 31, 1912.
1,052,608.
Patented Feb. 11, 1913.
3 SHEETS—SHEET 2.
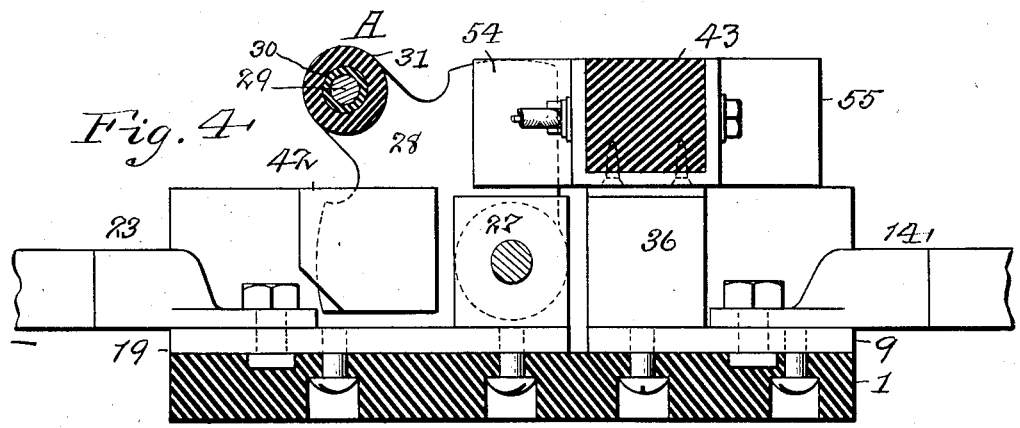
Fig. 4.
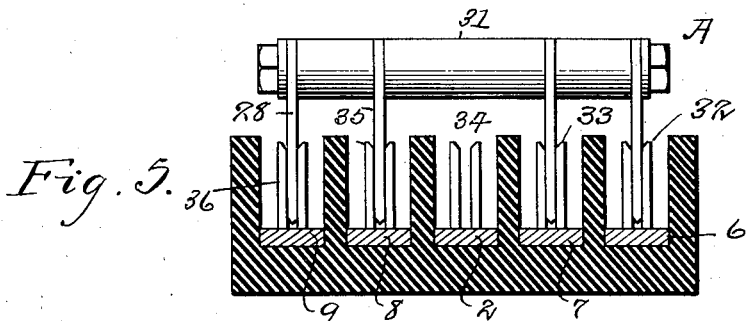
Fig. 5.
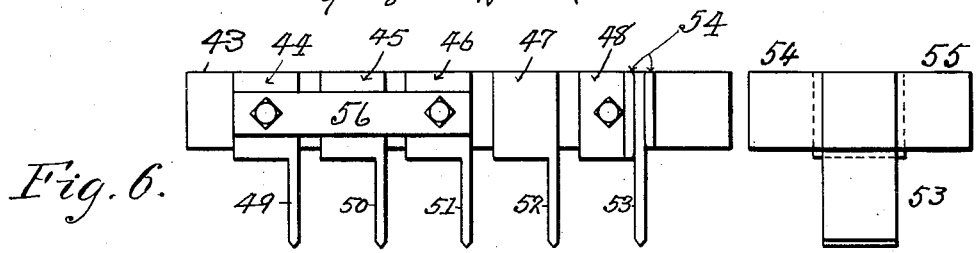
Fig. 6.
Fig. 7.
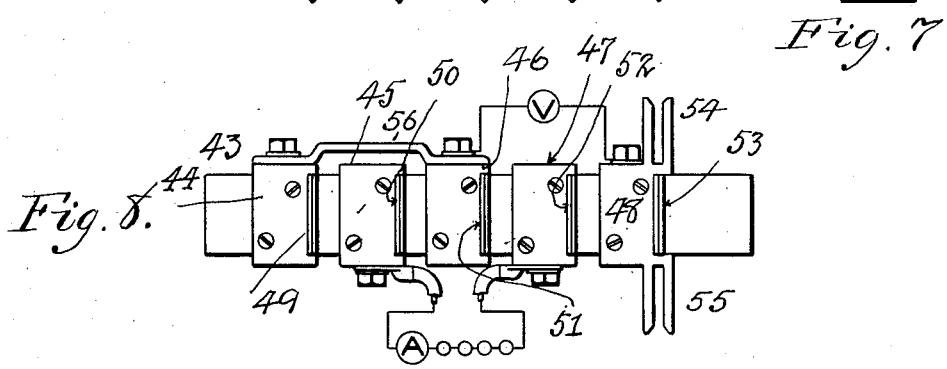
Fig. 8.
WITNESSES
Gertrude N Porter
May T. McGarry
INVENTOR
Arthur V. A. McHarg
BY Paul Benjamin
his ATTORNEY

UNITED STATES PATENT OFFICE.

ARTHUR V. A. McHARG, OF NEW YORK, N. Y.

METER-TESTING CUT-OUT.

1,052,608.     Specification of Letters Patent.     Patented Feb. 11, 1913.

Application filed May 31, 1912. Serial No. 700,565.

*To all whom it may concern:*

Be it known that I, ARTHUR V. A. MC-HARG, a citizen of the United States, residing at New York, in the county of New York and State of New York, have invented a certain new and useful Improvement in Meter-Testing Cut-Outs, of which the following is a specification.

The invention relates to a meter testing cut-out, and consists in the construction, hereinafter set forth, whereby a switch gang lever on the base, when placed in one position, establishes direct circuit from service leads to load, and when placed in another position, establishes circuit from service leads to load through the meter. When the lever is in the first-named position, a gang plug, to which testing instruments are connected, coöperates with suitable contacts on the base and with one of the lever arms to establish circuit through the meter and said testing instruments. By this means, the meter can be tested without interrupting current supply from the service leads to the load.

Figure 9:
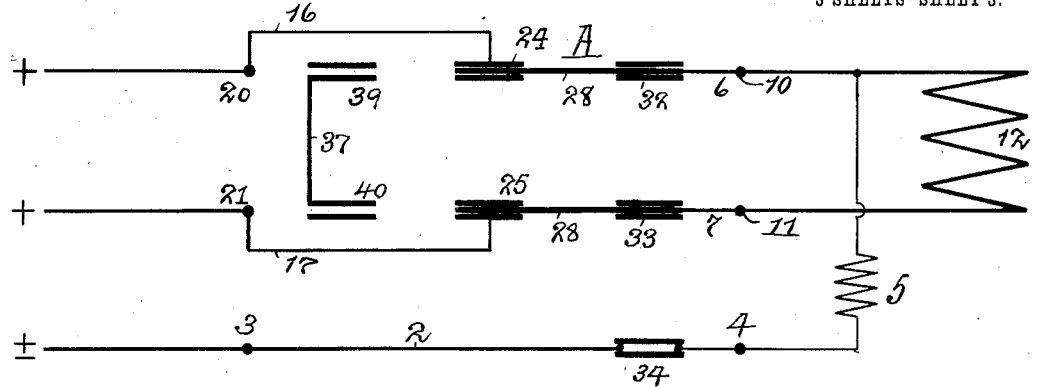
Figure 9:
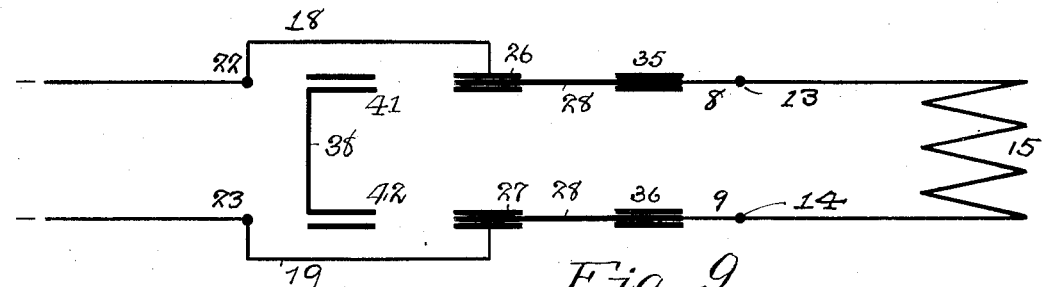
Figure 10:
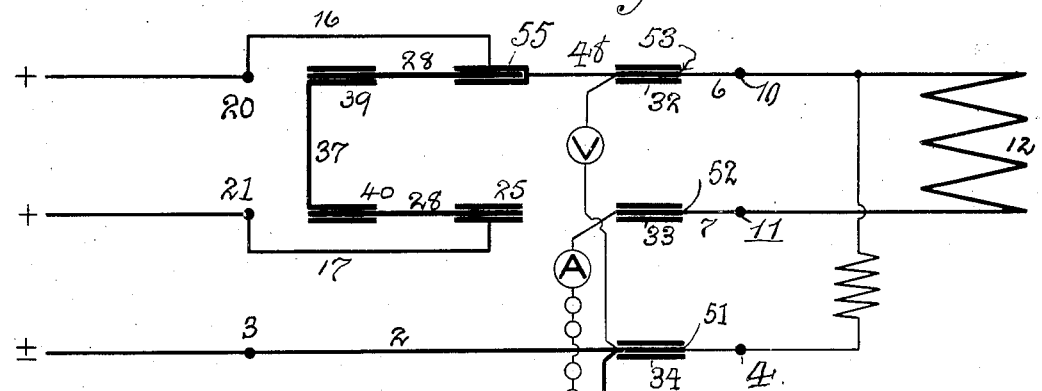
Figure 10:
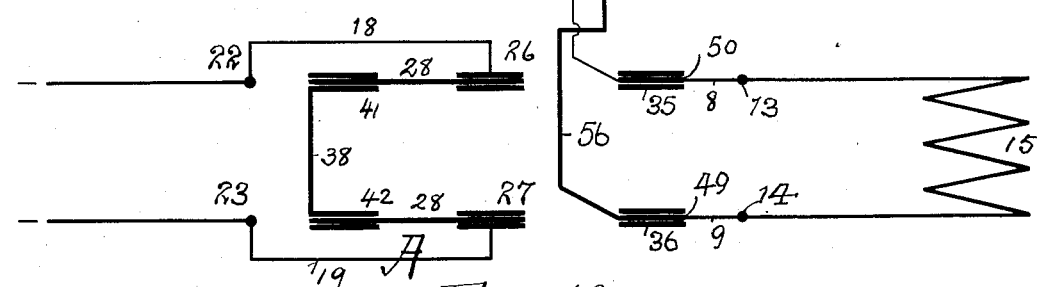

In the accompanying drawings—Figure 1 is a plan view of my meter testing cut-out, showing the gang switch lever A in running position to close circuit to meter. Fig. 2 is a section on line $x$, $x$ of Fig. 1. Fig. 3 is a section on line $z$, $z$ of Fig. 1. Fig. 4 is a section, similar to Fig. 2, with the gang switch lever A in position to cut out the meter, and the meter testing gang plug in place. Fig. 5 is a section on line $y$, $y$ of Fig. 2. Fig. 6 is a side elevation, and Fig. 7 is an end elevation of the gang plug. Fig. 8 is a plan view of the gang plug, showing the connections for the testing instruments. Fig. 9 is a diagram, showing the circuits when the switch is in running position (Fig. 1), and Fig. 10 is a diagram, showing the circuits when the switch is swung to cut out the meter, and when the testing gang plug is in place.

Similar letters and numbers of reference indicate like parts.

1 is the base block of insulating refractory material, such as porcelain, having five longitudinal channels. On the bottom of the middle channel is a metal bar 2. To one end 3 of said bar the neutral lead of a three-wire system is connected. To the other end 4 is connected the meter potential coil 5. On the bottoms of the other channels are four metal bars 6, 7, 8, 9. One meter field coil 12 is connected to the ends 10, 11 of bars 6, 7. The other meter field coil 15 is connected to the ends 13, 14 of bars 8, 9. Also in said channels are four other metal bars 16, 17, 18, 19, separated from the bars 6, 7, 8, 9. The positive service and load leads are connected at 20, 21 to bars 16, 17. The negative service and load leads are connected at 22, 23 to bars 18, 19.

On bars 16, 17, 18, 19 are four pairs of upwardly extending plates 24, 25, 26, 27. Between the members of each pair are pivoted the four arms 28 of the gang switch lever A. Each of said arms is approximately triangular in shape, as best shown in Figs. 2 and 4. A headed rod 29 which extends through said arms, is insulated therefrom by bushings 30, Fig. 2, and is secured by a nut on its end. Insulating sleeves 31 are carried by said rod and are interposed between the arms 28, and between the outer arms and the nut and head on said rod. The rod and sleeves form an operating handle for the gang switch lever A.

On the bars 6, 7, 8, 9 are four upwardly extending pairs of contact plates 32, 33, 35, 36. When the switch lever A is swung on its pivots into the position shown in Figs. 1, 2, and 5, its arms 28 enter between the pairs 32, 33, 35 and 36.

On top of two of the longitudinal partitions in the base are secured bridge plates 37, 38. Integral with plate 37, Fig. 3, and depending into the adjacent channels are two pairs of contact plates 39, 40. Integral with plate 38 and depending into the adjacent channels are two pairs of contact plates 41, 42. When the switch lever A is swung into the position shown in Fig. 4, its arms 28 enter between the members of said pairs of contact plates 39, 40, 41 and 42.

The meter testing gang plug, Figs. 6, 7, 8, comprises a bar 43 of insulating material, which is received in five U-shaped metal plates 44, 45, 46, 47, 48, integral with which plates are downwardly depending contacts 49, 50, 51, 52, 53. Integral with the end plate 48 and on opposite sides thereof are pairs of contact clips 54, 55. The contacts 49 and 51 are connected by a strip 56. The voltmeter terminals are connected to the plates 44 and 46. The ammeter terminals are connected to the plates 45, 47.

The operation of the device is as follows: Under normal or running conditions, the switch lever A is swung into the position shown in Figs. 1 and 9. The positive main supply current then proceeds from positive service lead to bar 16, one arm 28 of lever A, contact plates 32, bar 6, meter field coil 12, bar 7, contact plates 33, another arm 28 of lever A, bar 17, and positive load lead. The negative service lead circuit similarly proceeds through meter field coil 15 to negative load lead. When it is desired to test the meter, lever A is swung into the position shown in Figs. 4 and 10, and the gang plug 43 is put in position. The plates 49, 50, 51, 52, 53 of said plug then enter the pairs of contacts 32, 33, 34, 35, 36, and the clip 54 is placed on the end arm 28 of lever A, as best shown in Fig. 4. The clip 55 is then idle. If the plug were reversed end for end, the clip 55 would be applied to the opposite end arm of lever A, and the clip 54 would be idle. The purpose of the two clips 54, 55 is, therefore, simply to permit the plug to be applied to either of the end arms of lever A. Circuit is then closed directly to load from the positive service lead, to bar 16, switch lever arm 28, contacts 39, plate 37, contacts 40, switch lever arm 28, bar 17, and positive load lead. Circuit from negative service lead to negative load lead proceeds in like manner. The meter test circuit proceeds from lever arm 28, to clip 55 on plug 43, to plate 48, contact 53, contacts 32, bar 6, field coil 12, bar 7, contacts 33, contact 52, through the ammeter and artificial load to contact 50, contact 35, bar 8, field coil 15, bar 9, contact 36, contact 49, strip 56, contact 51, contact 34, bar 2 and neutral. The voltmeter then becomes connected from contact 32 to contact 34.

I claim:

1. A meter testing cut-out, comprising a base, service, load and meter circuit terminals thereon, and a gang switch lever on said base and coöperating when in one position with said service and load terminals to establish direct circuit from service to load, and coöperating when in another position with said service, load and meter terminals to establish circuit from service through the meter to load; the said circuit to load being constantly maintained.

2. A meter testing cut-out, comprising a base, service, load and meter circuit terminals thereon, a gang switch lever on said base and coöperating when in one position with said service and load terminals to establish direct circuit from service to load, and coöperating when in another position with said service, load and meter terminals to establish circuit from service through the meter to load, a gang plug having contacts coöperating with said switch lever and with said meter terminals, and meter testing apparatus connected to said plug contacts; the said circuit to load being constantly maintained.

3. A meter testing cut-out, comprising a base, service and load terminals thereon, a gang switch on said base having four mutually insulated arms respectively connected to said terminals, two pairs of fixed contacts, and bridges connecting the members of said pairs: the said switch arms coöperating with said fixed contacts and bridges to establish direct circuit from said service terminals to said load terminals.

4. A meter testing cut-out, comprising a base, service, load and meter terminals thereon, a gang switch lever having four mutually insulated arms connected to said service and load terminals, two pairs of fixed contacts, bridges connecting the members of said pairs, and four fixed contacts connected to said meter terminals: the said switch arms when in one position coöperating with said first-named fixed contacts and bridges to establish circuit directly from said service terminals to said load terminals, and when in another position coöperating with said last-named fixed contacts to establish circuit between said service terminals, meter terminals and load terminals.

5. A meter testing cut-out, comprising a base, service, load and meter terminals thereon, a gang switch lever having four mutually insulated arms connected to said service and load terminals, two pairs of fixed contacts, bridges connecting the members of said pairs, and four fixed contacts connected to said meter terminals: the said switch arms when in one position coöperating with said first-named fixed contacts and bridges to establish circuit directly from said service terminals to said load terminals, and when in another position coöperating with said last-named fixed contacts to establish circuit between said service terminals, meter terminals and load terminals, and a gang plug having contacts coöperating with the contacts connected to said meter terminals, and a contact coöperating with one of said switch lever arms, and testing apparatus connected to said first-named plug contacts.

In testimony whereof I have affixed my signature in presence of two witnesses.

ARTHUR V. A. McHARG.

Witnesses:
 GERTRUDE T. PORTER,
 MAY T. McGARRY.